(12) United States Patent
Li et al.

(10) Patent No.: US 11,691,669 B2
(45) Date of Patent: Jul. 4, 2023

(54) STEERING SYSTEM OF ENGINEERING VEHICLE AND BACKHOE LOADER

(71) Applicant: JIANGSU XCMG CONSTRUCTION MACHINERY RESEARCH INSTITUTE LTD., Jiangsu (CN)

(72) Inventors: Jun Li, Jiangsu (CN); Yanbo Geng, Jiangsu (CN); Penghui Zhou, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 87 days.

(21) Appl. No.: 17/433,048

(22) PCT Filed: Sep. 3, 2020

(86) PCT No.: PCT/CN2020/113187
§ 371 (c)(1),
(2) Date: Aug. 23, 2021

(87) PCT Pub. No.: WO2022/036762
PCT Pub. Date: Feb. 24, 2022

(65) Prior Publication Data
US 2022/0234650 A1 Jul. 28, 2022

(30) Foreign Application Priority Data
Aug. 20, 2020 (CN) .......................... 202010845049.2

(51) Int. Cl.
*B62D 5/093* (2006.01)
*B62D 5/09* (2006.01)
(Continued)

(52) U.S. Cl.
CPC ............. *B62D 5/093* (2013.01); *B62D 15/02* (2013.01); *B62D 5/092* (2013.01); *E02F 9/225* (2013.01)

(58) Field of Classification Search
CPC ................................ B62D 5/091; B62D 5/093
See application file for complete search history.

(56) References Cited

U.S. PATENT DOCUMENTS

| | | | |
|---|---|---|---|
| 4,909,343 | A | 3/1990 | Mouri et al. |
| 2007/0095598 | A1 | 5/2007 | Williams |
| 2018/0281852 | A1 | 10/2018 | Eagles |

FOREIGN PATENT DOCUMENTS

| | | |
|---|---|---|
| CN | 1891552 A | 1/2007 |
| CN | 102351005 A | 2/2012 |

(Continued)

OTHER PUBLICATIONS

Chinese Office Action for CN Application No. 202010845049.2 dated Sep. 17, 2021 (11 pages, with English translation).
(Continued)

*Primary Examiner* — Kevin Hurley
(74) *Attorney, Agent, or Firm* — Merchant & Gould P.C.

(57) ABSTRACT

The present disclosure provides a steering system of an engineering vehicle, and a backhoe loader. The steering system includes: a direction control device, including a steering wheel, a steering cylinder and steerable wheels, the steering cylinder being in transmission connection with the steering wheel and the steerable wheels; a displacement sensor configured to detect a piston displacement of the steering cylinder; a return motor in transmission connection with the steerable wheels to drive the steerable wheels to return to a normal position; and a controller in signal connection with the displacement sensor and the return motor, and configured to output a control signal according to the piston displacement detected by the displacement sensor (Continued)

to manipulate the return motor to drive the steerable wheels to return. The backhoe loader includes the steering system.

13 Claims, 1 Drawing Sheet

(51) Int. Cl.
*B62D 15/02* (2006.01)
*E02F 9/22* (2006.01)

(56) References Cited

FOREIGN PATENT DOCUMENTS

| CN | 103192871 A | | 7/2013 | |
| CN | 204161461 U | | 2/2015 | |
| CN | 104661899 A | * | 5/2015 | ............ B62D 7/144 |
| CN | 107140017 A | | 9/2017 | |
| CN | 107901979 A | | 4/2018 | |
| CN | 108725573 A | | 11/2018 | |
| CN | 209667200 U | | 11/2019 | |
| CN | 110843905 A | | 2/2020 | |
| CN | 114291735 B | * | 11/2022 | |
| EP | 2463177 A1 | | 6/2012 | |
| JP | 2009280188 A | * | 12/2009 | |
| JP | 2010137782 A | | 6/2010 | |

OTHER PUBLICATIONS

Extended European Search Report for PCT/CN2020/113187 dated Oct. 10, 2022 (7 pages).
International Search Report and Written Opinion issued in corresponding International Patent Application No. PCT/CN2020/113187 dated May 19, 2021, 9 pages (with English Translation).
Chinese Office Action for Chinese Patent Application No. 202010845049.2 dated Apr. 6, 2021 (English translation, 10 pages).
Chinese Office Action for CN Application No. 202010845049.2 dated Jun. 16, 2022 (16 pages).

* cited by examiner

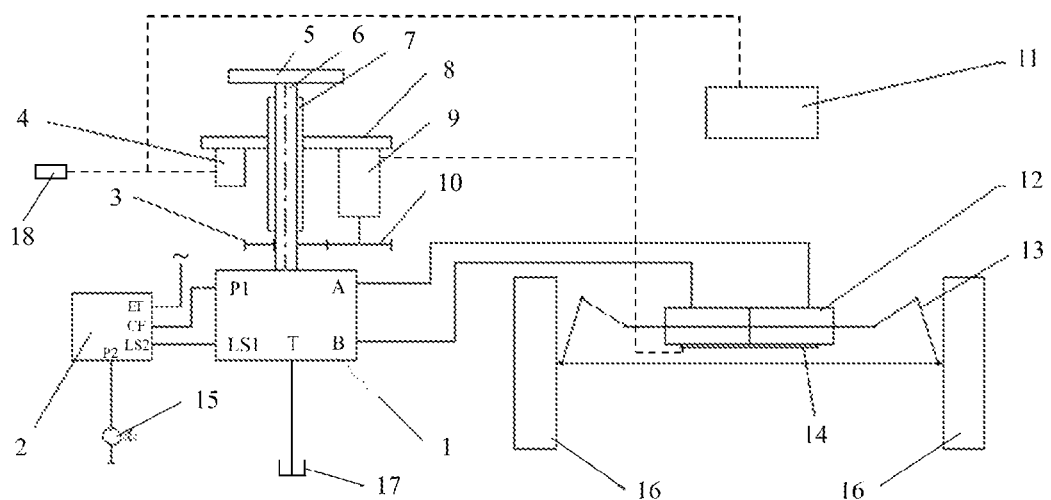

STEERING SYSTEM OF ENGINEERING VEHICLE AND BACKHOE LOADER

CROSS-REFERENCE TO RELATED APPLICATIONS

This application is a National Stage Application of PCT/CN2020/113187, filed 3 Sep. 2020, which claims benefit of Serial No. 202010845049.2, filed 20 Aug. 2020 in China and which applications are incorporated herein by reference. To the extent appropriate, a claim of priority is made to each of the above disclosed applications.

FIELD

The present disclosure relates to the field of engineering vehicle, in particular to a steering system of an engineering vehicle, and a backhoe loader.

BACKGROUND

A wheeled engineering vehicle has a heavy body and large tire size, and often runs on roads of the construction site where the use conditions are harsh, the steering resistance is large, and frequent steering is required. Thus, the purpose of light and convenient manipulation and rapid steering will be difficult to achieve if a mechanical steering system is used therefor. To reduce a driver's fatigue, most engineering vehicles use a hydraulic power steering system. A full hydraulic steering system, as a type of hydraulic power steering system, has the characteristics of light and convenient steering operations, stable work, and convenient layout of the whole vehicle, and is widely used in medium and low speed wheeled engineering vehicles. In recent years, it has been increasingly applied to backhoe loaders and other models.

During use of a backhoe loader equipped with a full hydraulic steering system, a driver needs to perform steering operations frequently. However, currently, a backhoe loader product has no automatic return function. Furthermore, due to a full hydraulic steering mode, a steering wheel of the backhoe loader cannot achieve the limit of end points of turning left and right, which makes it difficult for the driver to determine the direction and position of the backhoe loader. He can perceive whether the steering wheel has returned and what angle the steering wheel is at only by observing a traveling path of the vehicle during a steering operation, which is not conducive to reducing the driver's operation intensity.

SUMMARY

An object of the present disclosure is to provide a steering system of an engineering vehicle, and a backhoe loader, to improve light and convenient manipulation of the steering system.

A first aspect of the present disclosure provides a steering system of an engineering vehicle, including:

a direction control device including a steering wheel, a steering cylinder and steerable wheels, the steering cylinder being in transmission connection with the steering wheel and the steerable wheels;

a displacement sensor configured to detect a piston displacement of the steering cylinder;

a return motor in transmission connection with the steerable wheels to drive the steerable wheels to return; and a controller in signal connection with the displacement sensor and the return motor, and configured to output a control signal according to the piston displacement detected by the displacement sensor to manipulate the return motor to drive the steerable wheels to return.

According to some embodiments of the present disclosure, the direction control device further includes:

a hydraulic pump; and a full hydraulic steering device, with an oil inlet and an oil return port of the full hydraulic steering device being respectively connected with an oil outlet of the hydraulic pump and a hydraulic oil tank, and two steering oil ports of the full hydraulic steering device being respectively connected with two working oil ports of the steering cylinder.

According to some embodiments of the present disclosure, the full hydraulic steering device is a load-sensitive full hydraulic steering device, and the direction control device further includes a priority valve arranged between the hydraulic pump and full hydraulic steering device.

According to some embodiments of the present disclosure, the direction control device further includes:

a steering shaft, the steering shaft being fixedly connected to the steering wheel, the steering shaft being in transmission connection with the full hydraulic steering device, and the return motor being in transmission connection with the steering shaft; and a steering tube arranged rotatably with respect to the steering shaft.

According to some embodiments of the present disclosure, the steering system further includes a return transmission mechanism, the return transmission mechanism including:

a first gear fixedly connected with the steering shaft; and a second gear in transmission connection with the return motor and the first gear.

According to some embodiments of the present disclosure, the direction control device further includes link mechanisms arranged between the steering cylinder and the steerable wheels.

According to some embodiments of the present disclosure, the displacement sensor is provided on the steering cylinder.

According to some embodiments of the present disclosure, the steering system further includes a display device in signal connection with the controller, the display device being configured to display the piston displacement of the steering cylinder and/or display a rotation angle of the steerable wheels calculated according to the piston displacement of the steering cylinder.

According to some embodiments of the present disclosure, the steering system further includes a holder fixedly connected to the steering tube, the return motor and the controller being mounted to the holder.

According to some embodiments of the present disclosure, the controller is configured to, when an absolute value of the piston displacement of the steering cylinder gradually decreases, manipulate the return motor to be energized until a piston of the steering cylinder moves to a middle position of the steering cylinder and the steerable wheels return.

According to some embodiments of the present disclosure, the steering system further includes a control switch in signal connection with the controller, the control switch being configured to switch steering modes of the steering system.

According to some embodiments of the present disclosure, the controller is configured to, when the control switch is turned on, manipulate the return motor to be energized until a piston of the steering cylinder moves to the middle position and the steerable wheels return.

A second aspect of the present disclosure provides a backhoe loader including the steering system in the first aspect of the present disclosure.

In the steering system of an engineering vehicle and the a backhoe loader provided by the present disclosure, the controller outputs a control signal to the return motor according to the piston displacement of the steering cylinder detected by the displacement sensor to manipulate the return motor to drive the steerable wheels to automatically return, which is beneficial to improving light and convenient manipulation of the steering system.

Other features and advantages of the present disclosure will become apparent from the following detailed description of exemplary embodiments of the present disclosure with reference to the accompanying drawings.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings:

FIG. 1 is a structure diagram of a steering system of some embodiments of the present disclosure.

DETAILED DESCRIPTION OF THE EMBODIMENTS

Technical solutions in the embodiments will be described below clearly and completely in conjunction with the accompanying drawings in the embodiments of the present disclosure. Obviously, the described embodiments are only part of, instead of all of embodiments of the present disclosure. The following description of at least one exemplary embodiment is actually only illustrative, and in no way serves as any limitation to the present disclosure and its application or use. Based on the embodiments of the present disclosure, all of other embodiments obtained by a person of ordinary skill in the art without creative work should fall into the protection scope of the present disclosure.

Unless specifically stated otherwise, the relative arrangement of components and steps, numerical expressions and numerical values set forth in these embodiments do not limit the scope of the present disclosure. Furthermore, it should be understood that, for ease of description, the sizes of various parts shown in the drawings are not drawn in accordance with actual proportional relationships. Technologies, methods, and devices known to those of ordinary skill in the related art may be not discussed in detail, but where appropriate, the technologies, methods, and device should be regarded as part of the specification as granted. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

In the description of the present disclosure, it should be understood that the use of terms such as "first" and "second" to define parts and components is only for the convenience of distinguishing the corresponding parts and components. Unless otherwise stated, the above terms have no special meanings, and therefore cannot be understood as limitations on the protection scope of the present disclosure.

In description of the present disclosure, it should be understood that orientation or position relations denoted by terms such as "front", "rear", "upper", "lower", "left", "right", "transverse", "longitudinal", "vertical", "horizontal", "top" and "bottom" are generally orientation or position relations illustrated based on the drawings, and are merely for the convenience of describing the present disclosure and simplifying description, and unless stated to the contrary, such terms do not indicate or imply the denoted devices or elements must have specific orientations or be constructed and operated in specific orientations, and thus cannot be understood as limiting the protection scope of the present disclosure; and orientation terms "inner" and "outer" refer to the inside and outside with respect to the contour of each component itself.

As shown in FIG. 1, some embodiments of the present disclosure provide a steering system of an engineering vehicle, including a direction control device, a displacement sensor 14, a return motor 9 and a controller 4.

The direction control device includes a steering wheel 5, a steering cylinder 12 and steerable wheels 16, the steering cylinder 12 being in transmission connection with the steering wheel 5 and the steerable wheels 16. The displacement sensor 14 is configured to detect a piston displacement of the steering cylinder 12. The return motor 9 is in transmission connection with the steerable wheels 16 to drive the steerable wheels 16 to return. The controller 4 is in signal connection with the displacement sensor 14 and the return motor 9, and the controller 4 is configured to output a control signal according to the piston displacement detected by the displacement sensor 14 to manipulate the return motor 9 to drive the steerable wheels 16 to return.

In the steering system of an engineering vehicle provided by the embodiments of the present disclosure, the controller outputs a control signal to the return motor according to the piston displacement of the steering cylinder detected by the displacement sensor to manipulate the return motor to drive the steerable wheels to automatically return, which is beneficial to improving light and convenient manipulation of the steering system, and there is no need to provide a sensing device such as a steerable wheel angle sensor or steering wheel torque sensor.

In some embodiments, the direction control device further includes a hydraulic pump 15 and a full hydraulic steering device 1. An oil inlet and an oil return port of the full hydraulic steering device 1 are respectively connected with an oil outlet of the hydraulic pump 15 and a hydraulic oil tank 17, and a first steering oil port A and a second steering oil port B of the full hydraulic steering device 1 are respectively connected with two working oil ports of the steering cylinder 12.

In some embodiments, the full hydraulic steering device 1 is a load-sensitive full hydraulic steering device, and the direction control device further includes a priority valve 2 arranged between the hydraulic pump 15 and full hydraulic steering device 1. The hydraulic pump 15 may supply oil to a steering circuit and working circuit of the engineering vehicle. The load-sensitive full hydraulic steering device and priority valve 2 may preferentially provide a flow output from the hydraulic pump 15 to the steering circuit according to requirement of the steering circuit to ensure the demand of performing a steering action without being influenced by a load pressure and a steering wheel speed, so that the steering action is smooth and reliable, and the remaining flow of the hydraulic pump 15 is provided to the working circuit.

As shown in FIG. 1, an oil inlet P2 of the priority valve 2 is connected to the oil outlet of the hydraulic pump; a first oil outlet CF of the priority valve 2 is connected to an oil inlet P1 of the load-sensitive full hydraulic steering device, and the flow output from the hydraulic pump 15 is preferentially provided to the steering circuit where the load-sensitive full hydraulic steering device is located, through the first oil outlet CF of priority valve 2; a second oil outlet EF of priority valve 2 is connected to the working circuit of the engineering vehicle; and a control oil port LS2 of the priority valve 2 is connected to a control oil port LS1 of the load-sensitive full hydraulic steering device.

In some embodiments, the direction control device further includes a steering shaft 6 and a steering tube 7. The steering shaft 6 is fixedly connected to the steering wheel 5, such as being fixedly connected to the steering wheel 5 through a spline structure provided on the steering wheel 5. The steering shaft 6 is in transmission connection with the full hydraulic steering device 1, such as being mounted to the full hydraulic steering device 1 through a spline structure provided on the steering shaft 6. The return motor 9 is in transmission connection with the steerable wheels 6. The steering tube 7 is arranged rotatably with respect to the steering shaft 6.

In some embodiments, the steering system further includes a return transmission mechanism, which may be a gear transmission mechanism, and the return transmission mechanism includes a first gear 3 and a second gear 10. The first gear 3 is fixedly connected to the steering shaft 6. For example, the first gear 3 may be mounted to the steering shaft 6 in a flat key fit manner. The second gear 10 is in transmission connection with the return motor 9, and the second gear 10 is in transmission connection with the first gear 3. As shown in FIG. 1, the first gear 3 and the second gear 10 directly engaged.

In some embodiments, the direction control device further includes link mechanisms 13 arranged between the steering cylinder 12 and the steerable wheels 16. As shown in FIG. 1, the steering cylinder 12 is a double-acting cylinder; both ends of the piston of the steering cylinder 12 are provided with piston rods; one ends of the two link mechanisms 13 arranged on two sides of the steering cylinder are connected to the two piston rods on both ends of a piston of the steering cylinder 12 by universal joints, and the other ends of the two link mechanisms 13 are connected to the steerable wheels 16; and the link mechanisms 13 and the piston rods of the steering cylinder 12 form a steering trapezoidal structure of the steering system.

In some embodiments, the displacement sensor 14 is provided on the steering cylinder 12. For example, it may be arranged inside or outside the steering cylinder 12 as a built-in or external displacement sensor.

In some embodiments, the steering system further includes a display device 11 in signal connection with the controller 4, the display device 11 being configured to display the piston displacement of the steering cylinder 12 and/or display a rotation angle of the steerable wheels 16 calculated according to the piston displacement of the steering cylinder 12. The display device 11 may be a separate display, or it may also be integrated in a display panel of a cab of the engineering vehicle. The display device 11 is provided to facilitate a driver of the engineering vehicle observing a steering state of the steerable wheels 16 through data displayed by the display device 11 and then quickly determining whether the steerable wheels 16 have return.

In some embodiments, the steering system further includes a holder 8 fixedly connected to the steering tube 7, the return motor 9 and the controller 4 being mounted to the holder 8.

During traveling of the engineering vehicle, after performing a steering operation, the driver needs to operate the steering wheel 5 to cause the steerable wheels 16 to return. During traveling of the engineering vehicle, the steering system may determine an operation intention of the driver according to a change of the piston displacement of the steering cylinder 12 detected by the displacement sensor 14. In the case where the driver is intended to cause the steerable wheels 16 to return, the steering system enables an automatic return function, thereby reducing the operation intensity of the driver and improving the manipulation comfort for the driver.

When an absolute value of the piston displacement of the steering cylinder 12 gradually increases or remains unchanged, it indicates that the driver is manipulating the steering wheel 5 to cause the steerable wheels 16 to turn, or the engineering vehicle is traveling in a straight line; and when the absolute value of the piston displacement of the steering cylinder 12 gradually decreases, it indicates that the driver has completed a steering operation and is operating the steering wheel 5 to cause the steerable wheels 16 to return.

To reduce the operation intensity of the driver and improve the manipulation comfort for the driver, in some embodiments, the controller 4 is configured to, when the absolute value of the piston displacement of the steering cylinder 12 gradually decreases, manipulate the return motor 9 to be energized until the piston of the steering cylinder 12 moves to the middle position and the steerable wheels 16 return.

A steering system of an engineering vehicle usually has multiple steering modes, such as two-wheel steering, four-wheel steering, and crab steering modes. When the engineering vehicle switches between the various steering modes, the piston of the steering cylinder 12 needs to return to the middle position such that the steerable wheels 16 return.

In some embodiments, the steering system further includes a control switch 18 in signal connection with the controller 4, the control switch 18 being configured to switch steering modes of the steering system.

To quickly switch the steering modes of the steering system, in some embodiments, the controller 4 is configured to, when the control switch 18 is turned on, manipulate the return motor 9 to be energized until the piston of the steering cylinder 12 moves to the middle position and the steerable wheels 16 return.

According to the above configuration of the controller 4, when the driver of the engineering vehicle operates the steering wheel 5 to cause the steerable wheels 16 to return or switches steering modes of the steering system, that is, when the absolute value of the piston displacement of the steering cylinder 12 gradually decreases or when the control switch for switching the steering modes of the steering system is turned on, the automatic return function of the steering system is enabled, and the controller 4 sends a control signal to the return motor 9 according to the piston displacement of the steering cylinder 12 detected by the displacement sensor 14, and the return motor 9 is energized and works with a certain output speed and output torque to drive the steerable wheels 16 to return.

In some embodiments, the controller described above may be embodied as a general-purpose processor, a programmable logic controller (PLC), a digital signal processor (DSP), an application specific integrated circuit (ASIC), a field-programmable gate array (FPGA) or other programmable logic device, a discrete gate or transistor logic device, a discrete hardware component, or any appropriate combination thereof, for performing the functions described in the present disclosure.

The working principle of the steering system of an engineering vehicle according to some embodiments of the present disclosure will be further described below in conjunction with FIG. 1.

As shown in FIG. 1, the steering system of an engineering vehicle includes a direction control device, a displacement sensor 14, a controller 4, a holder 8, a return transmission mechanism, a return motor 9, a display device 11 and a control switch.

The direction control device includes a steering wheel 5, a steering shaft 6, a steering tube 7, a hydraulic pump 15, a priority valve 2, a full hydraulic steering device 1, a steering cylinder 12, link mechanisms 13 and steerable wheels 16. The steering wheel 5, the steering shaft 6, the full hydraulic steering device 1, the steering cylinder 12, the link mechanisms 13 and the steerable wheels 16 are successively in transmission connection to form a complete transmission chain. The hydraulic pump 15, the priority valve 2, the full hydraulic steering device 1 and the steering cylinder 12 are connected through a hydraulic pipeline via corresponding oil ports to form a steering circuit of the engineering vehicle.

The controller 4 is in signal connection with the displacement sensor 14, the return motor 9, the display device 11 and the control switch 18. The displacement sensor 14 is provided on the steering cylinder 12 and may detect a piston displacement of the steering cylinder 12 in real time, and sends the detected piston displacement to the controller 4. The control switch 18 is configured to switch steering modes of the steering system. The display device 11 is configured to display the piston displacement of the steering cylinder 12 and/or display a rotation angle of the steerable wheels 16 calculated according to the piston displacement of the steering cylinder 12.

The return transmission mechanism includes a first gear 3 and a second gear 10 engaged with each other, the first gear 3 being mounted to the steering shaft 6, and an output shaft of the return motor 9 being connected to the second gear 10.

In the case where an automatic return function of the steering system is not enabled, the return motor 9 is in a power-off state, and the first gear 3, the second gear 10 and the return motor 9 are in a follow-up state at this time.

When an absolute value of the piston displacement of the steering cylinder 12 gradually decreases or when the control switch for switching the steering modes of the steering system is turned on, the automatic return function of the steering system is enabled. The controller 4 sends a control signal to the return motor 9 according to the piston displacement detected by the displacement sensor 14; the return motor 9 provides a motive power required for the steerable wheels 16 to return, according to the control signal sent by the controller 4, and successively drives the second gear 10, the first gear 3 and the steering shaft 6; and the steering shaft 6 successively drives the full hydraulic steering device 1, the steering cylinder 12, the link mechanisms 13 and the steerable wheels 16, and drives the steering wheel 5, such that the steerable wheels 16 and the steering wheel 5 automatically return.

The piston displacement detected by the displacement sensor 14 is defined as follows: when the steerable wheels 16 are in a non-steering state, that is, when a piston of the steering cylinder 12 is in the middle position, the piston displacement detected by the displacement sensor 14 is 0; when the steerable wheels 16 are in a left steering state, the piston displacement detected by the displacement sensor 14 is a negative value; and when the steerable wheels 16 are in a right steering state, the piston displacement detected by the displacement sensor 14 is a positive value.

If the piston displacement detected by the displacement sensor 14 is a negative value, the controller 4 controls the return motor 9 to rotate clockwise at a constant speed to drive the second gear 10, the first gear 3 and the steering shaft 6, such that the steering wheel 5 rotates to the right and the piston displacement of the steering cylinder 12 gradually increases until the piston displacement becomes 0.

If the piston displacement detected by the displacement sensor 14 is a positive value, the controller 4 controls the return motor 9 to rotate counterclockwise at a constant speed to drive the second gear 10, the first gear 3 and the steering shaft 6, such that the steering wheel 5 rotates to the left and the piston displacement of the steering cylinder 12 gradually decreases until the piston displacement becomes 0.

If the piston displacement detected by the displacement sensor 14 is 0, indicating that the piston of the steering cylinder 12 is already in the middle position and the steerable wheels 16 have return, the controller 6 controls the return motor 9 to be de-energized, and the automatic return function of the steering system is disabled.

The steering system of an engineering vehicle of the embodiment of the present disclosure has at least one of the following advantages:

The steering system may, according to the driver's intention, enable the automatic return function when the driver operates the steering wheel to cause the steerable wheels to return or when he switches the steering modes of the steering system, which is beneficial to reducing the steering operation intensity of the driver.

When the automatic return function is disabled, the return motor and the return transmission mechanism are in a follow-up state, so that the steering resistance is not increased, which is beneficial to improving the light and convenient manipulation of the steering system, and to reducing the steering operation intensity of the driver.

The controller controls, according to the piston displacement of the steering cylinder, the return motor to drive the steering cylinder, which can achieve closed-loop control of the steering cylinder, so that the piston of the steering cylinder can be accurately positioned after the automatic return function is enabled, which is beneficial to reducing the deviation between an actual value of the piston position of the steering cylinder or the rotation angle of the vehicle wheels controlled by the steering wheel and an expected value thereof, caused by internal leakage of the steering cylinder.

The display device configured to display the piston displacement of the steering cylinder and/or the rotation angle of the steerable wheels calculated according to the piston displacement of the steering cylinder facilitates the driver quickly judging whether the steerable wheels has returned.

The steering system uses a piston displacement signal of the steering cylinder as a detection signal for the controller to manipulate the steerable wheels to automatically return, so there is no need to provide a sensing device such as a steerable wheel angle sensor or steering wheel torque sensor.

The steering system is compatible with a steering column structure commonly used in engineering vehicles, requires no additional installation space, and is suitable for installation in various engineering vehicles, which is conducive to popularization and application.

Some embodiments of the present disclosure further provide a backhoe loader including the aforementioned steering system. The backhoe loader provided by the embodiments of the present disclosure has the corresponding advantages of the aforementioned steering system.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the technical solutions sought for protection in the present disclosure.

The invention claimed is:

1. A steering system of an engineering vehicle, comprising:
    a direction control device comprising a steering wheel, a steering cylinder and steerable wheels, the steering cylinder being in transmission connection with the steering wheel and the steerable wheels;
    a displacement sensor configured to detect a piston displacement of the steering cylinder;
    a return motor in transmission connection with the steerable wheels to drive the steerable wheels to return to a normal position; and
    a controller in signal connection with the displacement sensor and the return motor, and configured to output a control signal according to the piston displacement detected by the displacement sensor to manipulate the return motor to drive the steerable wheels to return.

2. The steering system according to claim 1, wherein the direction control device further comprises:
    a hydraulic pump; and
    a full hydraulic steering device, with an oil inlet and an oil return port of the full hydraulic steering device being respectively connected with an oil outlet of the hydraulic pump and a hydraulic oil tank, and two steering oil ports of the full hydraulic steering device being respectively connected with two working oil ports of the steering cylinder.

3. The steering system according to claim 2, wherein the full hydraulic steering device is a load-sensitive full hydraulic steering device, and the direction control device further comprises a priority valve arranged between the hydraulic pump and full hydraulic steering device.

4. The steering system according to claim 2, wherein the direction control device further comprises:
    a steering shaft, being fixedly connected to the steering wheel and being in transmission connection with the full hydraulic steering device, and the return motor being in transmission connection with the steering shaft; and
    a steering tube arranged rotatably with respect to the steering shaft.

5. The steering system according to claim 4, further comprising a return transmission mechanism, the return transmission mechanism comprising:
    a first gear fixedly connected with the steering shaft; and
    a second gear in transmission connection with the return motor and the first gear.

6. The steering system according to claim 1, wherein the direction control device further comprises link mechanisms arranged between the steering cylinder and the steerable wheels.

7. The steering system according to claim 1, wherein the displacement sensor is provided on the steering cylinder.

8. The steering system according to claim 1, further comprising a display device in signal connection with the controller, the display device being configured to display the piston displacement of the steering cylinder and/or display a rotation angle of the steerable wheels calculated according to the piston displacement of the steering cylinder.

9. The steering system according to claim 4, further comprising a holder fixedly connected to the steering tube, the return motor and the controller being mounted to the holder.

10. The steering system according to claim 1, wherein the controller is configured to, when an absolute value of the piston displacement of the steering cylinder gradually decreases, manipulate the return motor to be energized until a piston of the steering cylinder moves to the middle position and the steerable wheels return.

11. The steering system according to claim 1, further comprising a control switch in signal connection with the controller, the control switch being configured to switch steering modes of the steering system.

12. The steering system according to claim 11, wherein the controller is configured to, when the control switch is turned on, manipulate the return motor to be energized until a piston of the steering cylinder moves to a the middle position and the steerable wheels return.

13. A backhoe loader, comprising the steering system of claim 1.

* * * * *